United States Patent
Mishra et al.

(10) Patent No.: US 11,949,597 B2
(45) Date of Patent: Apr. 2, 2024

(54) PLATFORM INDEPENDENT ON DEMAND NETWORK MANAGEMENT AND MONITORING

(71) Applicant: Cisco Technology, Inc., San Jose, CA (US)

(72) Inventors: Mankamana Prasad Mishra, San Jose, CA (US); Anuj Budhiraja, San Jose, CA (US); Nitin Kumar, San Jose, CA (US); Sridhar Santhanam, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 17/543,278

(22) Filed: Dec. 6, 2021

(65) Prior Publication Data
US 2023/0179527 A1    Jun. 8, 2023

(51) Int. Cl.
*H04L 47/10* (2022.01)
*H04L 12/18* (2006.01)
*H04L 43/0829* (2022.01)

(52) U.S. Cl.
CPC ............ *H04L 47/15* (2013.01); *H04L 12/18* (2013.01); *H04L 43/0829* (2013.01)

(58) Field of Classification Search
CPC . H04L 12/18; H04L 41/0677; H04L 41/0686; H04L 43/0829; H04L 43/0888; H04L 43/16; H04L 47/15
See application file for complete search history.

(56) References Cited

U.S. PATENT DOCUMENTS

| | | | |
|---|---|---|---|
| 8,339,973 B1 * | 12/2012 | Pichumani | H04L 43/10 370/248 |
| 10,785,809 B1 | 9/2020 | Thubert et al. | |
| 11,057,235 B1 * | 7/2021 | Varahabhotla | H04L 12/185 |
| 2006/0187854 A1 | 8/2006 | Booth, III et al. | |

(Continued)

FOREIGN PATENT DOCUMENTS

CN    106230634 A    * 12/2016

OTHER PUBLICATIONS

Makofske et al., "M Health: A Real-Time Multicast Tree Visualization and Monitoring Tool", University of California, Santa Barbara, NOSSDAV '99, Jun. 1999, Total Pages: 12 (Year: 1999).*

(Continued)

*Primary Examiner* — Shah M Rahman
(74) *Attorney, Agent, or Firm* — Lee & Hayes, P.C.

(57) ABSTRACT

In an example method, an instruction to begin monitoring incoming traffic of a multicast data flow is received by a router. The instruction is received from a downstream router. The example method further includes monitoring incoming traffic of the multicast data flow. At least partly in response to determining that an expected amount of the incoming traffic of the multicast data flow is being received at the router, reporting to a network administrator device, a location of the router in the multicast data flow. Further, at least partly in response to determining that an expected amount of the incoming traffic of the multicast a data flow is not being received, sending, by the router and to an upstream router, an instruction to begin monitoring incoming traffic of the multicast data flow.

20 Claims, 5 Drawing Sheets

(56) References Cited

U.S. PATENT DOCUMENTS

| | | | |
|---|---|---|---|
| 2007/0230361 A1* | 10/2007 | Choudhury | H04L 41/5003 370/250 |
| 2010/0103822 A1* | 4/2010 | Montwill | H04L 41/0645 370/242 |
| 2010/0125886 A1 | 5/2010 | Qian et al. | |
| 2011/0302320 A1* | 12/2011 | Dunstan | H04L 12/185 370/252 |
| 2011/0317696 A1* | 12/2011 | Aldrin | H04L 12/1881 370/389 |
| 2012/0014309 A1* | 1/2012 | Iizuka | H04L 45/16 370/312 |
| 2012/0033667 A1* | 2/2012 | Venkataraman | H04L 45/16 370/390 |
| 2012/0236734 A1* | 9/2012 | Sampath | H04L 12/4641 370/252 |
| 2014/0348022 A1* | 11/2014 | Jain | H04L 41/12 370/254 |
| 2015/0146575 A1* | 5/2015 | Singh | H04L 45/48 370/256 |
| 2016/0112481 A1* | 4/2016 | Pani | H04L 65/611 370/390 |
| 2017/0353383 A1 | 12/2017 | Hughes et al. | |
| 2018/0063018 A1* | 3/2018 | Bosch | H04L 47/822 |
| 2019/0377463 A1 | 12/2019 | Fletcher et al. | |
| 2020/0044880 A1* | 2/2020 | Sankaran | H04L 41/0816 |
| 2020/0092218 A1* | 3/2020 | Flomen | H04L 65/80 |
| 2020/0313915 A1* | 10/2020 | Seth | H04L 69/22 |
| 2021/0091968 A1* | 3/2021 | Kumar M R | H04L 12/1854 |

OTHER PUBLICATIONS

Asaeda Keio Univ. T. Jinmei et al:"Mtrace Version 2: Traceroute Facility for IP Multicast", Jul. 12, 2010, 20 pages.

The PCT Search Report and Written Opinion dated Apr. 3, 2023 for PCT application No. PCT/US2022/051933, 14 pages.

Tempia Bonda G. et al: "Requirements for IP Multicast Performance Monitoring", Jan. 17, 2011, 5 pages.

* cited by examiner

PLATFORM INDEPENDENT ON DEMAND NETWORK MANAGEMENT AND MONITORING

TECHNICAL FIELD

The present disclosure relates generally to determining a fault location in a service provider network by providing on demand monitoring for a data flow in the network when traffic loss has been detected.

BACKGROUND

Many organizations depend on service providers to manage and provide computing resources to fulfill the needs of the organization without the organization having to invest in and maintain their own computing infrastructure. For example, cloud computing often involves the use of networks of data centers which house servers, routers, and other devices that provide computing resources to users such as compute resources, networking resources, storage resources, database resources, application resources, and so forth. Users may be allocated portions of the computing resources, including portions of one or more host servers that may provide compute functionality and one or more target servers that may provide storage for use by the host servers.

Within such data-center architectures, communications between computing devices are often routed through an array of switches, routers, and other computer networking devices. In addition, some of the communications between computing devices of these architectures comprise group communications that are addressed to groups of destination computing devices, wherein each of these destination computing devices has previously subscribed to the group in order to receive the group communications. For example, some of the communications comprise multicast messages, where a packet originating from a source may be sent to each of multiple computing devices that has subscribed to receive this multicast traffic.

However, there is limited ability to monitor all the individual multicast data flows in the provider network, leading to difficulty in identifying a faulty part of a network when a loss in multicast data traffic is experienced by an end user, such as an organization depending on the service provider infrastructure. Additionally, port bandwidth is growing exponentially, but hardware counter resources are not increasing at the same rate. This results in a network that is not sufficiently monitored to assist in failure location detection, or hardware resources that are significantly slowed, in order to sufficiently monitor multicast traffic flow in the network.

Consider, for example, an airport security system. A busy airport may have 100,000 security cameras connected to a service provider network (SPN). If traffic loss from one of the security camera feeds is experienced, it is critical that the faulty network hardware device responsible for traffic loss is immediately detected and reported so a network administrator may take the necessary step to remedy the detected fault. However, the sheer number of traffic flows in the network, make it impractical to assign hardware resources to be used to monitor each of the data flows. This situation results in not only lost data, but lost time and money in determining where a faulty section of the network might be when a security camera feed goes down.

Accordingly, there is a need to quickly provide on demand traffic flow monitoring when a fault is detected without overtaxing hardware resources so a network administrator may efficiently remedy the detected fault in a critical multicast data flow in a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
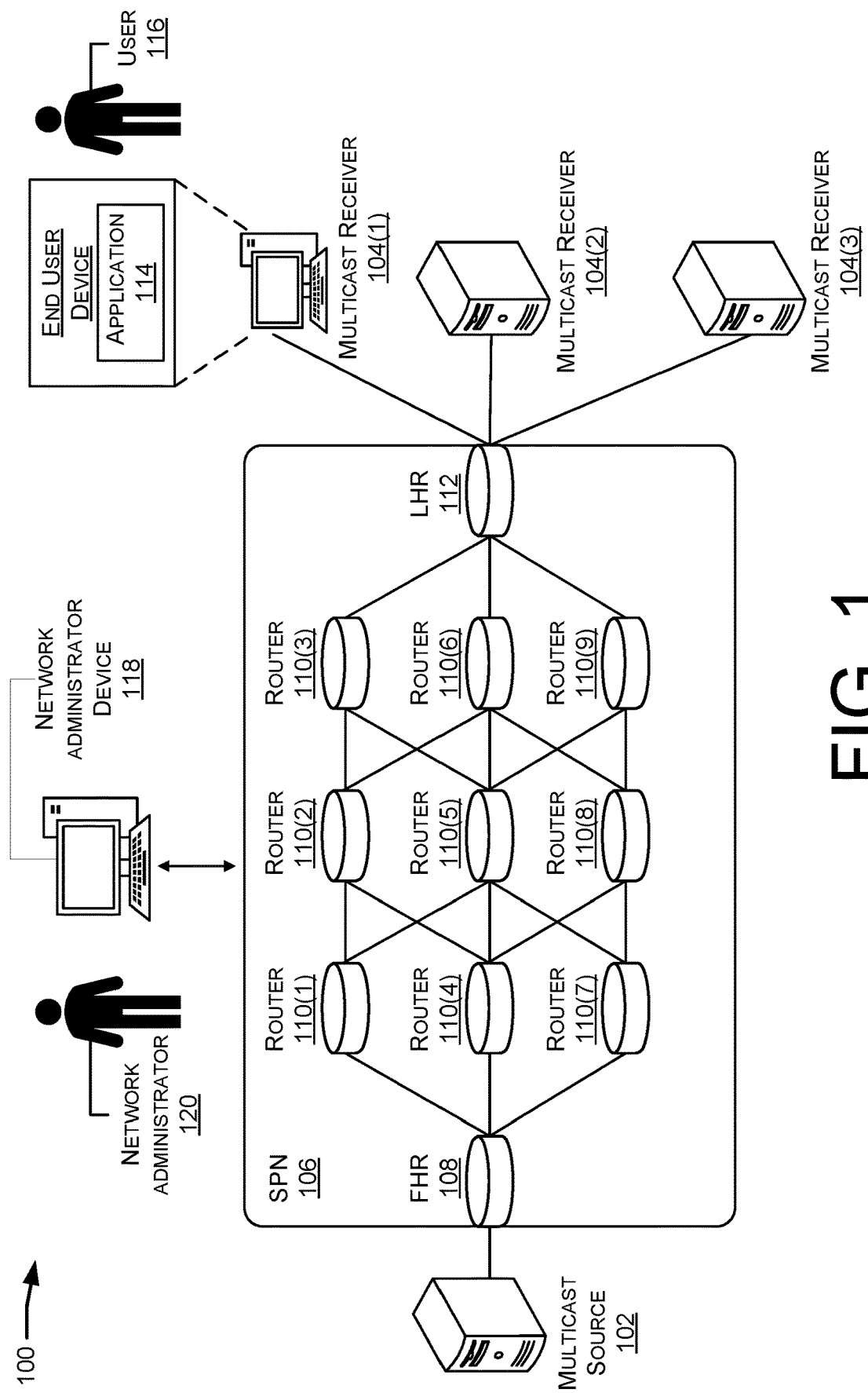
FIG. 1 illustrates an example network environment for monitoring a data flow of a multicast network and determining a network fault location.

This disclosure describes various implementations for providing on demand monitoring of a multicast data flow in a communication network when traffic loss on the network is identified. Additionally, once a faulty part of the network is identified, the location of the fault is reported to a network administrator for remediation. A type-length-value (TLV) encoded message is exchanged between routers in the network, the TLV uses three bits in Value field to communicate to an upstream router in the network that traffic loss is detected, to enable statistics, and whether to hold before sending the TLV upstream. Additionally, the communication protocol of the multicast network is platform independent.

Examples described herein provide a system including a processor and a non-transitory computer-readable media storing instructions that, when executed by the processor, cause the processor to perform operations. The operations include identifying a multicast data flow that is experiencing traffic loss, monitoring, by a last hop router of the multicast data flow, incoming traffic of the multicast data flow being received at the last hop router from an upstream router of the multicast data flow, determining, by the last hop router, that an expected amount of the incoming traffic of the multicast data flow is being received at the last hop router form the upstream router, and at least partly in response to the determining, reporting by the last hop router and to a network administrator device, a location of the last hop router in the multicast data flow.

In some cases, the computer-readable media is further configured to cause the processor to perform operations further including determining, by the last hop router, that the expected amount of incoming traffic of the multicast data flow is not being received, and sending, by the last hop router and to the upstream router, an instruction to start monitoring incoming traffic of the multicast data flow.

In some implementations, the upstream router is a first upstream router, and the computer-readable media is further configured to cause the processor to perform operations including receiving, at the first upstream router, the instruction to start monitoring, monitoring, by the first upstream router, incoming traffic of the multicast data flow being received at the first upstream router from a second upstream router of the multicast data flow, at least partly in response to determining that an expected amount of the incoming traffic of the multicast data flow is being received at the first upstream router from the second upstream router, reporting, by the first upstream router and to the network administrator device, a location of the first upstream router in the multicast data flow, and at least partly in response to determining that an expected amount of incoming traffic of the multicast data flow is not being received at the first upstream router form the second upstream router, sending, by the first upstream router and to the second upstream router, and instruction to start monitoring traffic of the multicast data flow.

In some cases, the operations further include sending, by the last hop router and to the upstream router, an instruction to start monitoring incoming traffic of the multicast data flow.

In various examples, the monitoring further includes, monitoring the incoming traffic of the multicast data flow at the last hop outer at least partly in response to the identifying that the multicast data flow is experiencing traffic loss.

According to some instances, the operations further include monitoring, by the last hop router, incoming traffic of the multicast data flow being received at the last hop router from the upstream router of the multicast data flow for a predetermined amount of time, determining, by the last hop router, that an expected amount of incoming traffic during the predetermined amount of time is being received at the last hop router from the upstream router; and at least partly in response to determining that the last hop router is receiving the expected incoming traffic of the multicast data flow, reporting, by the last hop router and to the network administrator device, the location of the last hop router in the multicast data flow.

In some examples, the monitoring also includes monitoring the incoming traffic of the multicast data flow at least partly in response to the identifying, and at least partly in response to the monitoring, sending, by the last hop router and to the upstream router, an instruction to start monitoring incoming traffic of the multicast data flow.

The operations may further include, receiving, from an end user device, a threshold loss upon which to begin monitoring the multicast data flow, storing an indication of the threshold traffic loss, and wherein the identifying comprises identifying that the multicast data flow is experiencing at least the threshold amount of traffic loss.

Additionally, the communication protocol used in the multicast data flow may be one of multicast traceroute (mTrace) signaling, protocol independent multicast (PIM) signaling, or multicast label distribution protocol (mLDP) signaling.

Examples described herein also provide a method implemented at least in part by a router of a multicast data flow, the method including receiving, from a downstream router of the multicast data flow, an instruction to begin monitoring incoming traffic of the multicast data flow, monitoring incoming traffic of the multicast data flow, at least partly in response to determining that an expected amount of the incoming traffic of the multicast data flow is being received at the router, reporting to a network administrator device, a location of the router in the multicast data flow, and at least partly in response to determining that an expected amount of the incoming traffic of the multicast data flow is not being received, sending to an upstream router of the multicast data flow, and instruction to being monitoring incoming traffic of the multicast data flow.

In some implementations, the instruction to begin monitoring received form the downstream router further include and instruction to monitor incoming traffic of the multicast data flow for a predetermined amount of time, monitoring incoming traffic of the multicast data flow for the predetermined amount of time; and at least partly in response to determining that the expected amount of the incoming traffic of the multicast data flow is not being received, sending, to the upstream router, an instruction to start monitoring incoming traffic of the multicast data flow for the predetermined amount of time.

The instruction to begin monitoring received from the downstream router may further include an instruction to immediately send, to the upstream router, the instruction to start monitoring incoming traffic of the multicast data flow.

In some examples of the method, the communication protocol used in the multicast data flow include one of multicast traceroute (mTrace) signaling, protocol independent multicast (PIM) signaling, or multicast label distribution protocol (mLDP) signaling.

According to some instances, the instruction to begin monitoring received from the downstream router is in a type-length-value (TLV) encoded format.

Additionally, a last three bits of a Value in the TLV include an enable statistics flag, a hold and transmit flag, and a traffic loss detected flag.

Example Embodiments

Various implementations of the present disclosure will be described in detail with reference to the drawings, wherein like reference numerals present like parts and assemblies throughout the several views. Additionally, any samples set forth in this application are not intended to be limiting and merely demonstrate some of the many possible implementations.

Typical data-center architectures include interconnected computer networking devices (e.g., routers, switches, etc.) configured to route enormous amounts of data traffic to other devices in the architecture. This traffic may include multicast communications among others (unicast, broadcast, etc.). Thus, these networks support an immense number of individual flows of traffic from a source to one or more destination that use the network for data transfer. When a particular flow in the network experiences data traffic loss, there is an urgent need to pinpoint the location of the fault in the network and report it to a network administrator so the issue can be remedied. Recently, network bandwidth has increased exponentially, from 100 Gbps to 400 Gbps and up to 800 Gbps. However, the hardware counter resources in computer networking devices, such as routers, are not increasing at the same rate. Thus, the hardware counter resources used to monitor data routed through the hardware devices, needs to be conserved in order to efficiently utilize the increased bandwidth.

Various implementations described herein go beyond traditional methods for monitoring a provider network and incorporate a platform independent solution for detecting and locating a network fault. This technology proposes the use of a type-length-value (TLV) encoded message sent to successively upstream routers of a particular flow that is experiencing traffic loss, until a location where the traffic loss is occurring is determined so that an action can be taken to remedy the fault.

There are two ways to identify a flow in a network that needs monitoring for fault location determination. First, a proactive monitoring approach may be used when circumstances indicate that it is critical to detect traffic loss immediately, even before an end-user experiences or reports a problem. Proactive monitoring is typically used when a particular flow is determined to be critical, where any traffic loss may have disastrous consequences. For example, in a busy airport, an airport security check, connected to a provider network, that uses facial recognition to identify every passenger in the airport for safety purposes, may be determined by airport personnel to be a critical flow in need of constant monitoring. With proactive monitoring, a last hop router (LHR) in the multicast data flow continually monitors incoming traffic flow. In addition to the LHR, one or more upstream routers in the network may also be configured to continually monitor data traffic flow. For example, every other router in the flow, or every $n^{th}$ router in the flow, may be configured for proactive monitoring. However, an end user may determine that the flow is no longer critical and disable proactive monitoring at any time. Typically, when proactive monitoring is enabled, the LHR will be configured, by an end user or application, to determine that traffic loss is occurring when less than the expected amount of traffic is received during a predetermined amount of time. For example, if the predetermined amount of time is set for one minute by an end user, and the LHR has not received any traffic for one minute, the LHP will begin the fault location detection process. Alternately or in addition, reactive monitoring may be used to determine that a flow is experiencing traffic loss and needs to be monitored to determine a location of the network fault. With reactive monitoring, an end user or application reports traffic loss to a network administrator, and the administrator enables traffic flow monitoring at a LHR to determine fault location. Alternately, an end user or application reporting traffic loss can automatically trigger the data traffic monitoring and fault locating process.

A multicast data flow in a network may require monitoring for fault location detection when the flow is experiencing total data loss, or partial data loss. Total loss of traffic will automatically trigger the fault location detection process at the LHR. In addition, an end user or application that is expecting a particular bit per second (bps) rate of data traffic for a particular flow, may determine an amount of data traffic loss that is unacceptable for that flow and requires activation of the fault location detection process. The end user or application provide a threshold amount of traffic loss, such that when a data flow is losing the threshold amount of data traffic or more, the flow monitoring and fault location detection process is triggered. The end user or application may change the threshold level as necessary. In some instances, when partial traffic loss is detected and the flow monitoring and fault location detection process is triggered, a router sending an instruction to begin monitoring to its neighboring upstream router may also include information pertaining to the amount of traffic loss the router is experiencing, or simply indicate the amount of traffic that the router is receiving.

Once a data flow has been identified that is experiencing traffic loss, traffic flow monitoring to determine a fault location begins at the LHR. The LHR begins, in the case of reactive monitoring, or continues, in the case of proactive monitoring, to monitor incoming traffic being received from an upstream router in the flow. If the LHR is receiving the expected amount of traffic, but traffic loss has been detected by an end user or application, then the LHR is the problem, as it is receiving data as expected but not sending data as expected. In this example, the LHR reports its location to a network administrator device, indicating that the LHR is the location of the network fault. The network administrator receives the location information of the LHR and can take the necessary action to remedy the fault.

Alternately, if the LHR is not receiving the expected amount of incoming data traffic from the upstream router, the LHR is not the location of the network fault, and the LHR sends a message to an upstream router that the LHR is experiencing traffic loss and an instruction to the upstream router to begin monitoring incoming traffic. The upstream router begins monitoring incoming traffic, if the expected amount of traffic is being received, but the LHR is not receiving the expected data traffic, the upstream router is the problem, and the upstream router sends its location to the network administrator device. Alternately, if the upstream router is not receiving the expected data traffic, the upstream router sends a message to its next neighboring upstream router that it is experiencing traffic loss and an instruction to begin monitoring incoming traffic. This process continues until a router is encountered that is receiving the expected amount of incoming traffic, but its neighboring downstream router is not receiving the expected amount of data traffic. This router then reports to the network administrator device its location in the flow indicating that it is the location of the network fault. If the process continues all the way up the flow to a first hop router (FHR) and the FHR is also not receiving the expected amount of incoming traffic, the problem is with the source of the data flow, and not in the provider network.

The data traffic flow monitoring enabled when a data flow has been identified as experiencing traffic loss, may be either end to end monitoring or hold and transmit monitoring. If end to end monitoring is enabled, when a router receives instructions to begin monitoring, it not only begins monitoring incoming traffic, but immediately sends instruction to its neighboring upstream router to begin monitoring incoming traffic. If the hold and transmit monitoring is enabled, when a router receives instructions to begin monitoring, the router monitors incoming traffic flow for a predetermined amount of time. When the predetermined amount of time has expired, only if the router is not receiving the expected amount of incoming traffic does the router send the instruction to begin monitoring to a neighboring upstream router. If the router is receiving the expected amount of incoming traffic, the router does not send the instruction to the neighboring upstream router, instead, the router sends its location to the network administrator device, indicating that the router is the location of the fault in the provider network.

When a router in a multicast data flow that is experiencing data traffic loss sends instruction to an upstream router to begin monitoring incoming traffic, the instructions are sent in a TLV encoded format in a message. For example, in a network using protocol independent multicast (PIM) signaling, a PIM join/prune message with a TLV about traffic loss is sent to the upstream router. However, the communication protocol is not limited to PIM, it may be multicast traceroute (mTrace) signaling, multicast label distribution protocol (mLDP) signaling, or any other appropriate communication protocol used in a network architecture.

The TLV sent to an upstream router and containing instructions to begin monitoring incoming traffic flow, contains a traffic loss detected flag, an enable statistics flag, and a hold and transmit flag. The traffic loss flag, when set, indicates that a router sending the message is experiencing traffic loss. The enable statistics flag, when set, tells the receiving router to start monitoring incoming traffic. The hold and transmit flag, when set, instructs the router receiving the message to start monitoring incoming traffic for a predetermined amount of time before determining whether or not to send instructions to start monitoring incoming traffic to its neighboring upstream router. In the message sent with the TLV, the Type is one byte and the Length is two bytes followed by the Value where only the last three bits of the Value field are used to encode the message, one bit each for the traffic loss detected flag, the enable statistics flag, and the hold and transmit flag.

FIG. 1 illustrates a point-to-multipoint (P2MP) system-architecture diagram in which computing devices route traffic, such as multicast traffic, within at least a portion of a network 100. The network 100 may comprise an array of computing devices, such as gateways, routers, network bridges, modems, wireless access points, networking cables, line drivers, switches, hubs, protocol converters, servers, firewalls, network address translators, multiplexers, network interface controllers, wireless network interface controllers, terminal adapters, and/or the like. In some examples, the network 100 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

As illustrated, the network 100 may include a multicast source device 102 that originates communication(s) that are sent to one or more multicast receivers 104(1), 104(2), and 104(3). For example, the multicast source device 102 may send communications associated with a specified group of computing devices, comprising a multicast communication that is sent, via devices in a service provider network (SPN) 106, to each destination device that has subscribed to the multicast group. As such, the SPN 106 may receive these communications and forward them along to one or more computer networking devices towards the destination device(s).

In the illustrated example, the multicast source device 102 may couple to a first hop router (FHR) 108 in the SPN 106, which in turn may couple to an intermediate router 110 (e.g., router 110(1), 110(4), or 110(7)). The illustrated example shows multiple pathways through the SPN 106 using any one of multiple combinations of routers 110 that a traffic flow may take to traverse the SPN 106. For example, data may initiate at the multicast source device 102 and be routed through the SPN 106 in a flow following the path of FHR 108, router 110(1), router 110(2), router 110(3), LHR 112 and reaching its destination at the multicast receiver 104(1). The LHR 112 in the SPN 106 may couple to one or more multicast receivers 104. In various implementations, a multicast receiver 104, such as multicast receiver 104(1) may be an end user device that deploys an application 114 available to a user 116 as illustrated. Additionally, a network administrator device 118 may couple to the SPN 106 for use by a network administrator 120 for network operating and administrative purposes. While FIG. 1 illustrates an example network in which the claimed techniques may be described, it is to be appreciated that the techniques may be implemented in an array of other networked environments having an array of other devices.

In some instances, proactive monitoring of a multicast data flow may occur where continuous monitoring at the LHR 112 detects data traffic loss of a multicast flow prior to, or in addition to, a report by the application 114 or the user 116. Alternately, when a multicast flow though the SPN 106 experiences data traffic loss, reactive monitoring may occur. When reactive monitoring occurs, the application 114 may be degraded as a result of the data traffic loss, and the user 116 may then react by reporting the degradation to a network administrator 120 via a network administrator device 118. Alternately or in addition, the application 114 itself may report traffic loss to the network administrator device 118. Upon receiving the report of degradation, the network administrator 120 may trigger network monitoring at the LHR 112 via the network administrator device 118. Alternately, monitoring of incoming traffic at the LHR may be automatically be triggered in response to the report of traffic loss by the application 114 or the user 116.

Once traffic loss in a flow is detected, either as a result of proactive monitoring or reactive monitoring, the fault location detection process begins at the LHR 112. The LHR 112 monitors incoming data traffic of the flow that has been identified as experiencing traffic loss. In some instances, hold and transmit monitoring may occur. During hold and transmit monitoring, the LHR 112 may monitor the incoming traffic for a predetermined amount of time. Once the predetermined amount of time has expired, the LHR 112 determines whether it has received the expected amount of incoming data traffic from an upstream router in the flow. If the LHR 112 has received the expected amount of data traffic from the upstream router, but the user 116 has reported application degradation, the LHR 112 is the network fault location. In this situation, the LHR 112 reports its location in the flow to the network administrator device 118 indicating the LHR is the fault location, and the network administrator 120 may take the necessary action to remedy the fault.

In some instances, the LHR 112 determines that it is not receiving the expected amount of incoming traffic from the upstream router in the flow that has been identified as experiencing data traffic loss. In this instance, the LHR 112 will send a message to the upstream router in the flow indicating that the LHR 112 is experiencing traffic loss and instructing the upstream router to start monitoring incoming traffic of the flow. For example, the flow experiencing data loss may initiate from the multicast source device 102 and route through the SPN 106 from the FHR 108, through router 110(4), router 110(5), router 110(6), the LHR 112, and finally to the multicast receiver 104(1) where the user 116 has reported degradation of the application 114. In this example, if the LHR 112 determines it is not receiving the expected amount of incoming traffic, the LHR 112 sends a message to router 110(6) indicating that the LHR 112 is not receiving the expected amount of data traffic in the flow, and instructing the router 110(6) to begin monitoring incoming traffic. If router 110(6) determines that it is also not receiving the expected amount of incoming traffic, router 110(6) will send a message to router 110(5) indicating that router 110(6) is not receiving the expected amount of data traffic and instructing router 110(5) to begin monitoring incoming traffic. This process continues until a router is encountered that is receiving the expected amount of data traffic. The router receiving the expected amount of data traffic, reports its location to the network administrator device 118, indicating that it is the location of the network fault. For example, if router 110(5) determines that it is experiencing incoming traffic loss, router 110(5) sends a message to router 110(4) that indicates router 110(5) is experiencing incoming traffic loss and instructing router 110(4) to begin monitoring incoming traffic. If router 110(4) determining that it is receiving the expected amount of incoming traffic, router 110(4) sends a location message to the network administrator device 118 indicating that router 110(4) is the fault location. The network administrator 120 may take the necessary action to remedy the fault.

In still another instance, end to end router monitoring may be triggered. Continuing with the above example, in end to end monitoring, instead of the LHR 112 monitoring incoming traffic for a predetermined amount of time, then sending a message to router 110(6), the LHR 112 may begin monitoring incoming traffic and immediately send a message to router 110(6) to begin monitoring incoming traffic. Router 110(6), in turn, begins monitoring incoming traffic and immediately sends a message to router 110(5) to begin monitoring incoming traffic. Router 110(5) begins monitoring incoming traffic and immediately sends a message to router 110(4) to begin monitoring incoming traffic. Router 110(4) begins monitoring incoming traffic and immediately sends a message to the FHR 108 to begin monitoring incoming traffic. This process continues until all the routers in the flow that is experiencing traffic loss are monitoring incoming traffic.

Figure 2:
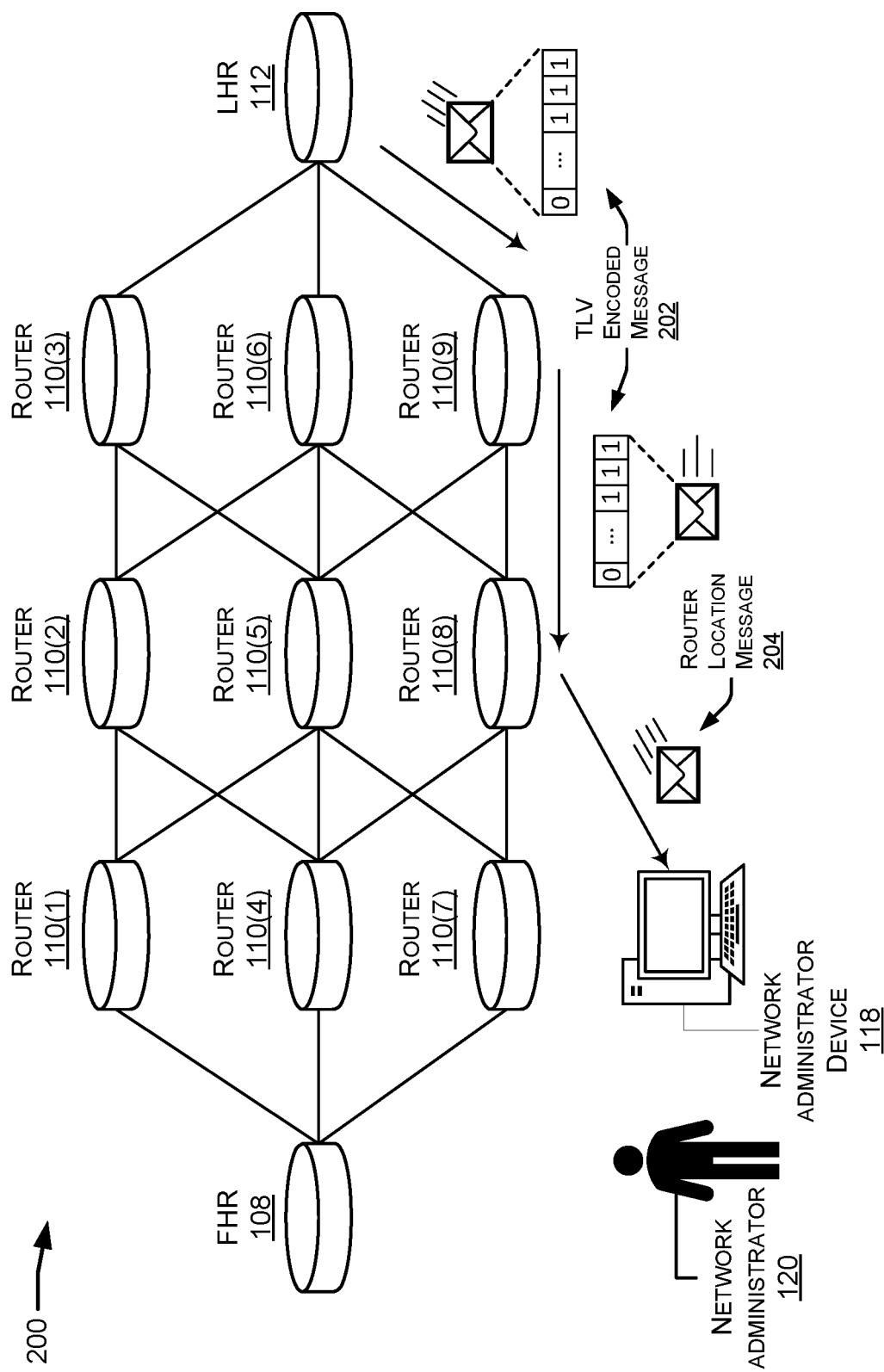
FIG. 2 illustrates an example environment for fault location determination in a SPN.

FIG. 2 illustrates an example scenario 200 within the SPN 106 described with regard to FIG. 1, for locating a network fault. For example, consider that a data flow from the FHR 108 and through router 110(7), router 110(8), router 110(9), and finally through the LHR 112, has been identified as experiencing data loss. The identification may have been done reactively, the user 116 as described with regard to FIG. 1, may have reported application 114 degradation to a network administrator device 118, and the network administrator 120 initiated the monitoring process at the LHR 112. Alternately, the identification may have been done proactively, where the LHR 112 continuously monitors incoming data traffic and the LHR 112 has determined it is not receiving the expected amount of incoming traffic.

Additionally, in some instances, the user 116 may define a threshold level of acceptable traffic loss for the above described flow that is experiencing traffic loss. If traffic loss is below the threshold level, the loss is deemed acceptable and no further monitoring or fault location detection is initiated. However, if the traffic loss is at or above the threshold level, the traffic loss is deemed unacceptable and the monitoring process at the LHR 112 is initiated in order to determine a location of a network fault responsible for traffic loss of the multicast data flow.

In some implementations, the LHR 112 sends a TLV encoded message 202 to an upstream router in the flow, in this example, router 110(9). As illustrated, the last three bits of the Value field are set. The last three bits of the value field are a traffic loss flag indicating that the LHR 112 is experiencing traffic loss, an enable statistics flag instructing the router 110(9) to begin monitoring incoming traffic, and a hold and transmit flag instructing router 110(9) to monitor incoming traffic for a predetermined amount of time and if traffic loss is experienced, transmit the TLV encoded message to the next upstream router, router 110(8) in this example. Alternately, the hold and transmit flag may not be set, in which case, the router 110(9) would immediately send a TLV encoded message without the hold and transmit flag set to router 110(8), in turn, router 110(8) would send the TLV encoded message to router 110(7), and router 110(7) would send the message to the FHR 108. Continuing with the illustrated example in which the hold and transmit flag is set, router 110(9) begins monitoring incoming traffic for a predetermined amount of time. As illustrated, after expiration of the predetermined amount of time, router 110(9) determines that it is experiencing incoming traffic loss. Router 110(9) then sends the TLV encoded message upstream to router 110(8). Router 110(8) begins monitoring incoming traffic for the predetermined amount of time. According to the illustrated example, upon expiration of the predetermined amount of time, router 110(8) determines that it is receiving the expected amount of incoming traffic, and router 110(8) sends a router location message 204 to the network administrator device 118 indicating that router 110(8) is receiving the expected amount of incoming traffic in the flow but the downstream router 110(9) is not. Thus router 110(8) is the location of the network fault. The network administrator 120 can then take the necessary action to remedy the fault at router 110(8) and restore proper data flow in the provider network.

Figure 3:
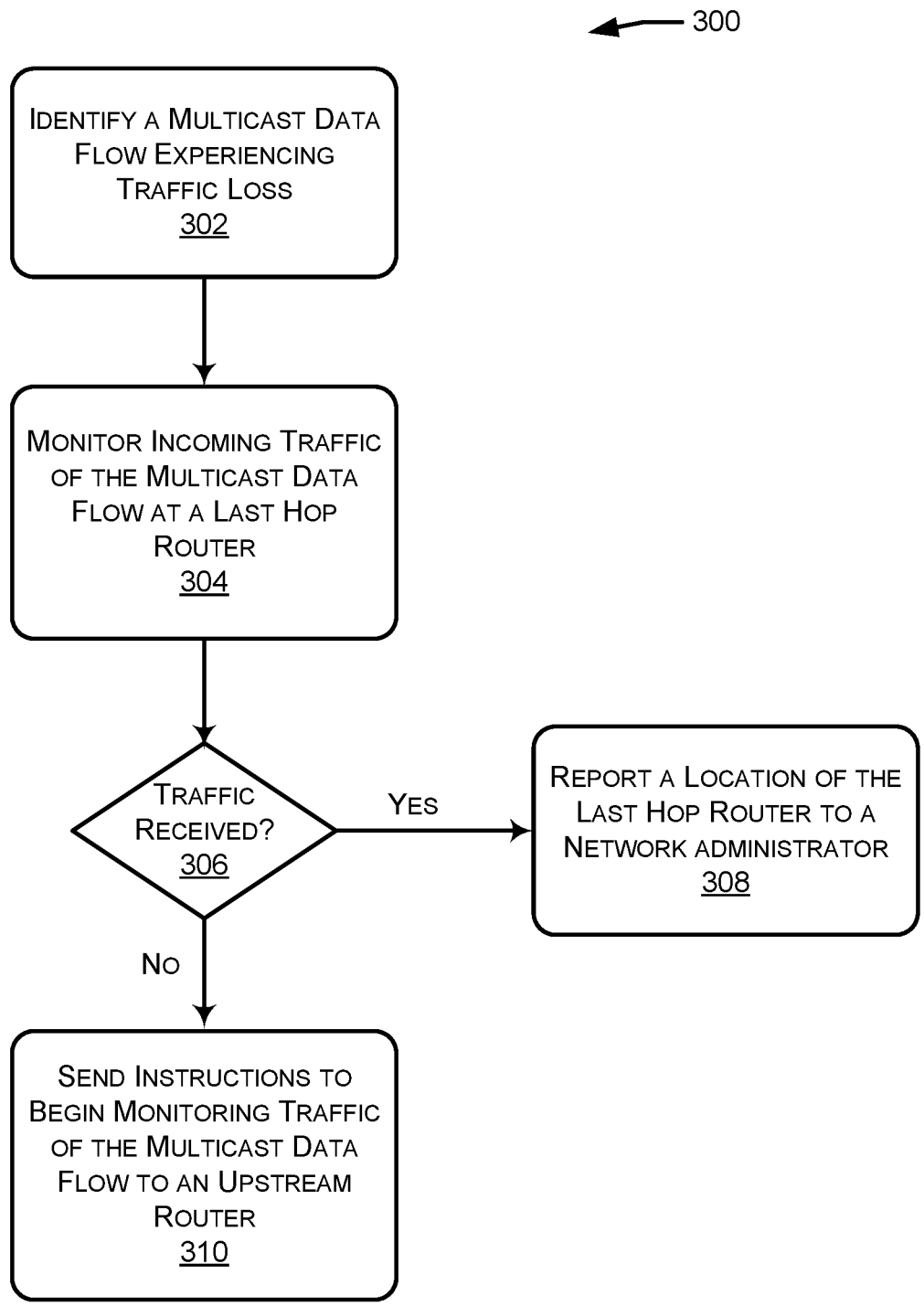
FIG. 3 illustrates an example process for fault location determination in a multicast data flow.

FIG. 3 illustrates an example process 300 for locating a network fault location in a multicast data flow that is experiencing traffic loss. The process 300 can be performed, at least in part, in a network environment as described above with reference to FIG. 1 and FIG. 2.

At an operation 302, a multicast data flow in a provider network that is experiencing traffic loss is identified. In some cases, an end user or application reports traffic loss to a network administrator. In other cases, a LHR continuously monitors a flow and identifies when traffic loss is experienced in the flow.

At operation 304, the LHR monitors incoming traffic of the identified multicast data flow. In some implementation, the LHR proactively monitors incoming traffic at all times. Alternately, the LHR does not begin monitoring incoming traffic until an end user or application reports traffic loss to a network administrator. According to some examples, the network administrator will enable traffic monitoring at the LHR, alternately, when an end user or application report traffic loss, monitoring at the LHR may be triggered automatically.

At operation 306, the LHR determines whether or not it is receiving the expected amount of incoming traffic. In some instances, the LHR expects a certain amount of traffic in a set amount of time. For example, the LHR may be preconfigured to expect so many bits per second (bps) in a data flow. If the LHR receives less bps than expected it determines that it is experiencing incoming traffic loss. In some cases, an end user or application may set a threshold amount of expectable traffic loss, under which the LHR determines it is not experiencing traffic loss, but when traffic loss reaches the predetermined threshold, the LHR determines that it is experiencing traffic loss.

At operation 308, the LHR determines that it is receiving the expected amount of traffic but the end user or application is not receiving the expected amount of traffic, therefore, the LHR reports its location to a network administrator indicating that the LHR is the location of the network fault.

At operation 310, the LHR determines that it is not receiving the expected amount of traffic and sends instructions to an upstream router to begin monitoring incoming traffic of the multicast data flow. In various implementation, the instructions are sent as a TLV encoded message containing a traffic loss flag, an enable statistics flag, and a hold and transmit flag.

Figure 4:
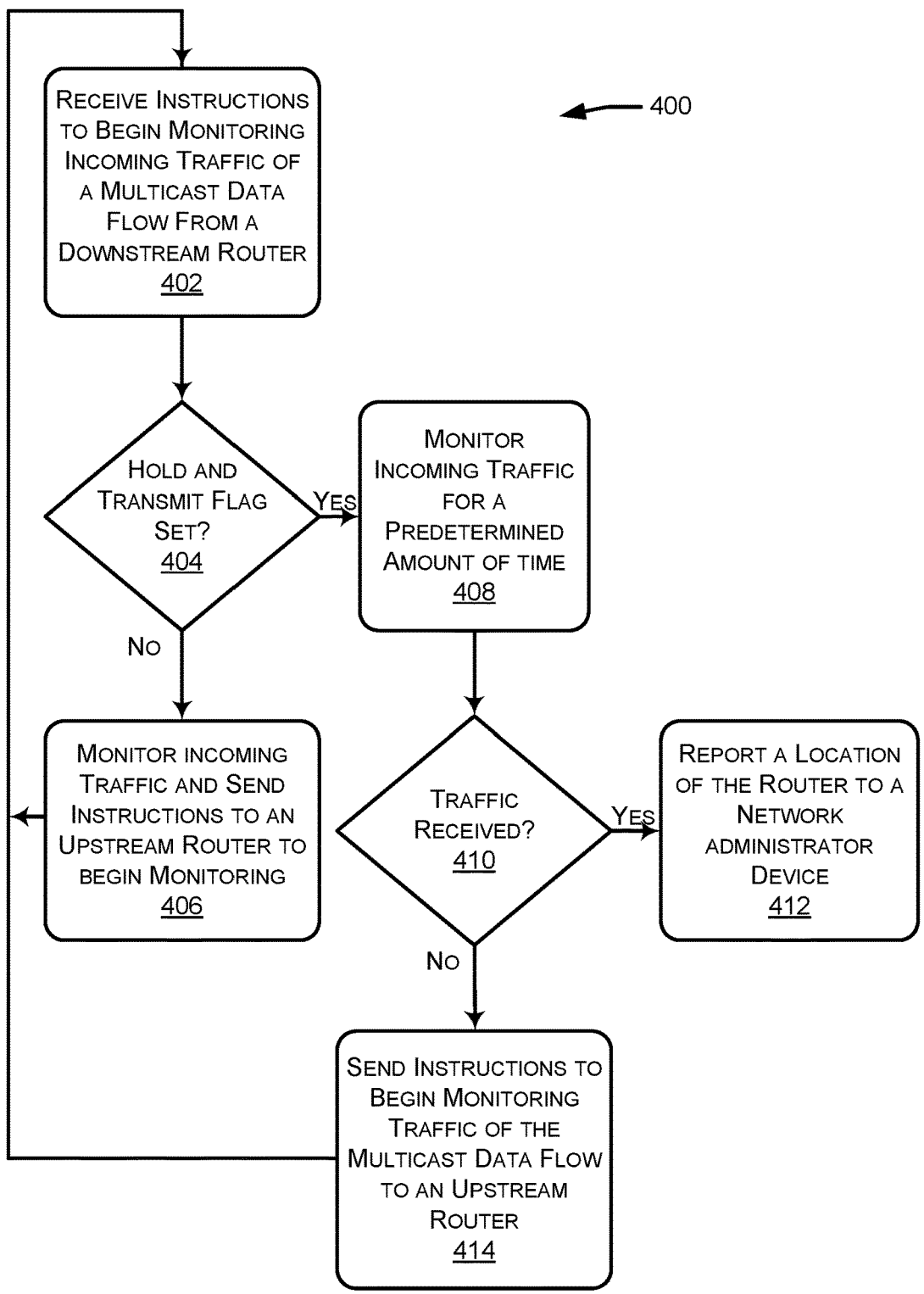
FIG. 4 illustrates an example process for fault location determination in a multicast data flow.

FIG. 4 illustrates an example process 400 for locating a fault in a network that is experiencing traffic loss in a multicast data flow. The process 400 may be performed, at least in part, by a router in a provider network as described above with reference to FIG. 1 and FIG. 2.

At operation 402, a router in a provider network receives instructions, from a downstream router in the network, to begin monitoring incoming traffic of a multicast data flow. For example, in some instances, PIM signaling may be used as the communication protocol in the network, and the router receives a PIM join/prune message from the downstream router that contains a monitoring TLV with the enable monitoring flag set. Alternately or in addition, other types of protocol may be used in the described operations. The techniques are not limited to PIM signaling, and any number of protocol may be used to implement the described operations, such as mTrace or mLDP, for example.

At operation 404, the router looks at the TLV encoded message received in the instructions, and checks whether the hold and transmit flag is set. Continuing with the above example using PIM protocol, when the router receives the join/prune message, the TLV has three flags, the traffic loss flag, that tells the router that the downstream router is experiencing traffic loss, the enable monitoring flag as discussed above with regard to operation 402, and the hold and transmit flag, that tells the router whether to immediately transmit a message to an upstream router to begin monitoring, or to hold while monitoring for a predetermined amount of time and transmit a message when the predetermined amount of time expires.

If the hold and transmit flag is not set, at operation 406, the router starts monitoring incoming traffic and immediately sends instructions to an upstream router to begin monitoring. Continuing with the PIM signaling protocol example above, the router sends a PIM join/prune message to the upstream router in the flow with the enable statistics flag set and the hold and transmit flag not set in the monitoring TLV.

If the hold and transmit flag in the TLV is set, at operation 408, the router starts monitoring incoming traffic for a predetermined amount of time before deciding to transmit a message to an upstream router in the flow.

At operation 410, after the predetermined amount of time has expired, the router determines whether or not the router is receiving the expected amount of incoming traffic. For example, the router may be preconfigured to expect to receive so many bps of data, if less that the expected bps are received, the router is experiencing traffic loss. According to some instances, the router may be preconfigured with a threshold of acceptable traffic loss. If traffic loss is under the threshold, the router determines that traffic is being received as expected, if the amount of traffic loss reaches or exceeds the threshold amount, the router determines it is experiencing traffic loss as the router is not receiving the expected amount of traffic in the multicast data flow.

At operation 412, the router determines that it is receiving the expected amount of traffic, or that at least the threshold amount of traffic loss has not been met. The router reports its location in the provider network to a network administrator via a network administrator device indicating that the router is the network fault location. Thus, the fault location is determined, the process completed, and the network administrator can take the necessary steps to remedy the network fault.

Alternately, if the router is not receiving the expected amount of incoming traffic, or the threshold of acceptable traffic loss has been met or exceeded, at operation 414, the router sends instructions to start monitoring incoming traffic to an upstream router in the multicast data flow. Continuing with the PIM signaling example above, the router sends a PIM join/prune message with the traffic loss flag set, the enable statistics flag set, and the hold and transmit flag set in the monitoring TLV in the message. The process then begins again with operation 402 at the upstream router. This process will continue until a router in the flow reports its location to the network administrator at operation 412, indicating the location of the network fault.

Figure 5:
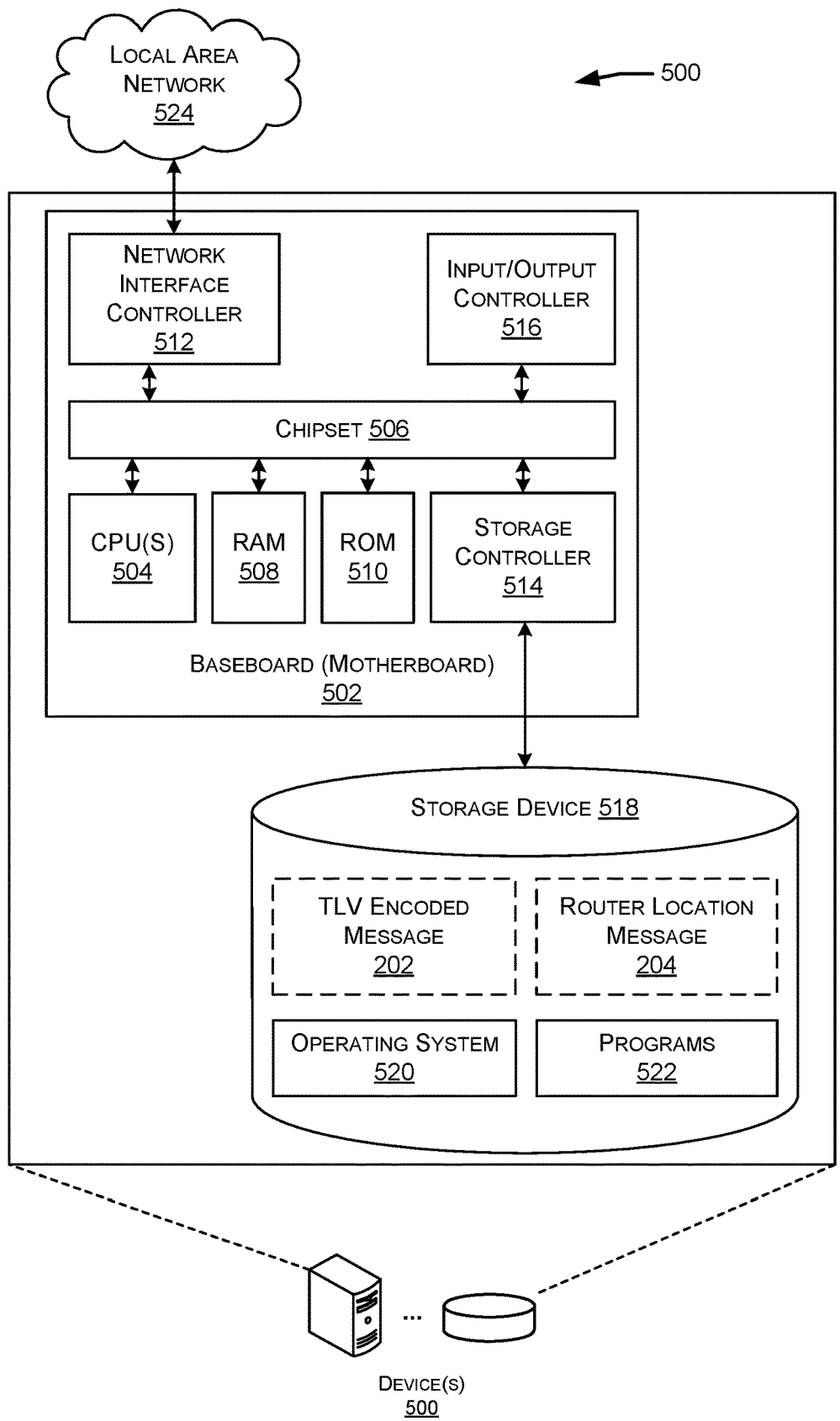
FIG. 5 shows an example computer architecture for a computing device capable of implementing any of the functionality described herein.

FIG. 5 shows an example computer architecture diagram illustrating computer hardware architecture for implementing a device 500 capable of implementing the functionality described herein. The multicast source device 102, the multicast receivers 104, the end user device with application 114, the network administrator device 118, the FHR 108, the LHR 112, and all other intermediate routers 110, described above, may include some or all of the components discussed below with reference to the device 500.

The device 500 includes a baseboard 502, or "motherboard," which is a printed circuit board to which a multitude of components or devices can be connected by way of a system bus or other electrical communication paths. In one illustrative configuration, one or more central processing units (CPUs) 504 operate in conjunction with a chipset 506. The CPUs 504 can be standard programmable processors that perform arithmetic and logical operations necessary for the operation of the device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a random-access memory (RAM) 508, used as the main memory in the device 500. The chipset 506 can further provide an interface to a computer-readable storage medium such as a read-only memory (ROM) 510 or non-volatile RAM (NVRAM) for storing basic routines that help to startup the device 500 and to transfer information between the various components and devices. The ROM 510 or NVRAM can also store other software components necessary for the operation of the device 500 in accordance with the configurations described herein.

The device 500 can operate in a networked environment using logical connections to remote computing devices and computer systems through a network, such as a local area network 524. The chipset 506 can include functionality for providing network connectivity through a Network Interface Card (NIC) 512, such as a gigabit Ethernet adapter. The NIC 512 is capable of connecting the device 500 to other computing devices over the network. It should be appreciated that multiple NICs 512 can be present in the device 500, connecting the computer to other types of networks and remote computer systems.

The device 500 can be connected to a storage device 518 that provides non-volatile storage for the computer. The storage device 518 can store an operating system 520, programs 522, and data, which have been described in greater detail herein. The storage device 518 can be connected to the device 500 through a storage controller 514 connected to the chipset 506. The storage device 518 can consist of one or more physical storage units. The storage controller 514 can interface with the physical storage units through a serial attached SCSI (SAS) interface, a serial advanced technology attachment (SATA) interface, an FC interface, or other type of interface for physically connecting and transferring data between computers and physical storage units.

The device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 500 can further read information from the storage device 518 by detecting the physical states or characteristics of one or more particular locations within the physical storage units.

In addition to the storage device 518 described above, the device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 500.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the device 500. According to one embodiment, the operating system comprises the LINUX™ operating system. According to another embodiment, the operating system includes the WINDOWS™ SERVER operating system from MICROSOFT Corporation of Redmond, Washington According to further embodiments, the operating system can comprise the UNIX™ operating system or one of its variants. It should be appreciated that other operating systems can also be utilized. The storage device 518 can store other system or application programs and data utilized by the device 500.

In one embodiment, the storage device 518 or other computer-readable storage media is encoded with computer-executable instructions which, when loaded into the device 500, transform the computer from a general-purpose computing system into a special-purpose computer capable of implementing the embodiments described herein. These computer-executable instructions transform the device 500 by specifying how the CPUs 504 transition between states, as described above. According to one embodiment, the device 500 has access to computer-readable storage media storing computer-executable instructions which, when executed by the device 500, perform the various processes described above with regard to FIGS. 1-4. The device 500 can also include computer-readable storage media having instructions stored thereupon for performing any of the other computer-implemented operations described herein.

The device 500 may also store, in the storage device 518, the TLV encoded message 202 and the router location message 204 for performing some or all of the techniques described above with reference to FIGS. 1-4.

The device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the device 500 might not include all of the components shown in FIG. 5, can include other components that are not explicitly shown in FIG. 5, or might utilize an architecture completely different than that shown in FIG. 5.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A system comprising:
   one or more processors; and
   one or more non-transitory computer-readable media storing computer-executable instructions that, when executed by the one or more processors, cause the one or more processors to perform acts comprising:
      receiving, by a last hop router, an indication that an application executing on an end user device has identified a multicast data flow that is experiencing traffic loss;
      monitoring, by the last hop router of the multicast data flow, incoming traffic of the multicast data flow being received at the last hop router from an upstream router of the multicast data flow;
      determining, by the last hop router, that an expected amount of the incoming traffic of the multicast data flow is being received at the last hop router from the upstream router; and
      at least partly in response to the determining, transmitting, by the last hop router and to a network administrator device, a message indicating a network fault is occurring at a location of the last hop router in the multicast data flow.

2. The system of claim 1, wherein the computer-readable media is further configured to cause the one or more processors to perform acts further comprising:
   determining, by the last hop router, that the expected amount of incoming traffic of the multicast data flow is not being received; and
   sending, by the last hop router and to the upstream router, an instruction to start monitoring incoming traffic of the multicast data flow.

3. The system of claim 2, wherein the upstream router is a first upstream router, wherein the computer-readable media is further configured to cause the one or more processors to perform acts comprising:
   receiving, at the first upstream router, the instruction to start monitoring incoming traffic;
   monitoring, by the first upstream router, incoming traffic of the multicast data flow being received at the first upstream router from a second upstream router of the multicast data flow;
   at least partly in response to determining that an expected amount of the incoming traffic of the multicast data flow is being received at the first upstream router from the second upstream router, transmitting, by the first upstream router and to the network administrator device, a message indicating a network fault is occurring at a location of the first upstream router in the multicast data flow; and
   at least partly in response to determining that an expected amount of the incoming traffic of the multicast data flow is not being received at the first upstream router from the second upstream router, sending, by the first upstream router and to the second upstream router, an instruction to start monitoring incoming traffic of the multicast data flow.

4. The system of claim 1, further comprising sending, by the last hop router and to the upstream router, an instruction to start monitoring incoming traffic of the multicast data flow.

5. The system of claim 1, wherein the computer-readable media is further configured to cause the one or more processors to perform acts comprising, continually monitor incoming traffic of the multicast data flow at the last hop router and one or more upstream routers of the multicast data flow.

6. The system of claim 1, wherein the monitoring comprises monitoring the incoming traffic of the multicast data flow at the last hop router at least partly in response to the identifying that the multicast data flow is experiencing traffic loss.

7. The system of claim 1 further comprising:
   monitoring, by the last hop router, incoming traffic of the multicast data flow being received at the last hop router from the upstream router of the multicast data flow for a predetermined amount of time;
   determining, by the last hop router, that an expected amount of incoming traffic during the predetermined amount of time is being received at the last hop router from the upstream router; and
   at least partly in response to determining that the last hop router is receiving the expected amount of incoming traffic of the multicast data flow, transmitting, by the last hop router and to the network administrator device, a message indicating a network fault is occurring at the location of the last hop router in the multicast data flow.

8. The system of claim 1, wherein the monitoring comprises monitoring the incoming traffic of the multicast data flow at least partly in response to the identifying, and further comprising:
   at least partly in response to the monitoring, sending, by the last hop router and to the upstream router, an instruction to start monitoring incoming traffic of the multicast data flow.

9. The system of claim 1, further comprising:
   receiving, from an end user device, a threshold amount of traffic loss upon which to begin monitoring the multicast data flow;
   storing an indication of the threshold traffic loss; and
   wherein the receiving comprises receiving, an indication that the application executing on the end user device is experiencing at least the threshold amount of traffic loss.

10. The system of claim 1, wherein a communication protocol used in the multicast data flow comprises one of multicast traceroute (mTrace) signaling, protocol independent multicast (PIM) signaling, or multicast label distribution protocol (mLDP) signaling.

11. A system comprising:
    one or more processors; and
    one or more non-transitory computer-readable media storing computer-executable instructions that, when executed by the one or more processors, cause the one or more processors to perform acts comprising:
       receiving, by a last hop router, an indication that an application executing on an end user device has identified a multicast data flow that is experiencing traffic loss;

monitoring, by the last hop router of the multicast data flow, incoming traffic of the multicast data flow being received at the last hop router from an upstream router of the multicast data flow;

determining, by the last hop router, that an expected amount of incoming traffic of the multicast data flow is not being received at the last hop router from the upstream router; and at least in partly in response to the determining, sending, by the last hop router and to the upstream router, an instruction to start monitoring incoming traffic of the multicast data flow.

12. The system of claim 11, wherein the computer-readable media is further configured to cause the one or more processors to perform acts comprising:

determining, by the last hop router, that an expected amount of the incoming traffic of the multicast data flow is being received at the last hop router from the upstream router; and at least partly in response to the determining, transmitting, by the last hop router and to a network administrator device, a message indicating a network fault is occurring at a location of the last hop router in the multicast data flow.

13. The system of claim 11, wherein the instruction is sent to the upstream router in a type-length-value (TLV) encoded format.

14. The system of claim 13, wherein a last three bits of a Value in the TLV comprise an enable statistics flag, a hold and transmit flag, and a traffic loss detected flag.

15. A method implemented at least in part by a router of a multicast data flow, the method comprising:

receiving, from a downstream router of the multicast data flow, an instruction to begin monitoring incoming traffic of the multicast data flow, wherein the instruction is based on receiving by the downstream router an indication that an application executing on an end user device has identified a multicast data flow that is experiencing traffic loss;

monitoring incoming traffic of the multicast data flow;

at least partly in response to determining that an expected amount of the incoming traffic of the multicast data flow is being received at the router, transmitting to a network administrator device, a message indicating a network fault is occurring at a location of the router in the multicast data flow; and at least partly in response to determining that an expected amount of the incoming traffic of the multicast data flow is not being received, sending to an upstream router of the multicast data flow, an instruction to begin monitoring incoming traffic of the multicast data flow.

16. The method of claim 15, wherein the instruction to begin monitoring received from the downstream router further comprise an instruction to monitor incoming traffic of the multicast data flow for a predetermined amount of time;

monitoring incoming traffic of the multicast data flow for the predetermined amount of time; and at least partly in response to determining that the expected amount of the incoming traffic of the multicast data flow is not being received, sending, to the upstream router, an instruction to start monitoring incoming traffic of the multicast data flow for the predetermined amount of time.

17. The method of claim 15, wherein the instruction to begin monitoring received from the downstream router further comprises an instruction to immediately send, to the upstream router, the instruction to start monitoring incoming traffic of the multicast data flow.

18. The method of claim 15, wherein a communication protocol used in the multicast data flow comprises one of multicast traceroute (mTrace) signaling, protocol independent multicast (PIM) signaling, or multicast label distribution protocol (mLDP) signaling.

19. The method of claim 15, wherein the instruction to begin monitoring received from the downstream router is in a type-length-value (TLV) encoded format.

20. The method of claim 19, wherein a last three bits of a Value in the TLV comprise an enable statistics flag, a hold and transmit flag, and a traffic loss detected flag.

* * * * *